UNITED STATES PATENT OFFICE.

LUDWIG OTTO HELMERS, OF HAMBURG, GERMANY, ASSIGNOR TO ICHTHYOL GESELLSCHAFT CORDES, HERMANNI & CO., OF HAMBURG, GERMANY.

SULFONIC-ACID SALTS OF ALKALINE EARTHY METALS AND METALS PROPER AND PROCESS OF MAKING SAME.

SPECIFICATION forming part of Letters Patent No. 722,507, dated March 10, 1903.

Original application filed September 2, 1899, Serial No. 729,355. Divided and this application filed May 12, 1902. Serial No. 107,038. (Specimens.)

*To all whom it may concern:*

Be it known that I, LUDWIG OTTO HELMERS, a subject of the German Emperor, residing at Hamburg, in the German Empire, have invented certain new and useful Improvements in Sulfonic-Acid Salts of Alkaline Earthy Metals and Metals Proper and Process of Making Same, of which the following is a specification.

In the specification of my pending application, filed September 2, 1899, Serial No. 729,355, of which the present application forms a divisional part, I have described the production of sulfonic-acid salts of easily-reducible metallic bases in about the following manner: The sulfonized compound obtained by the action of sulfuric acid upon hydrocarbons free from sulfur is to be neutralized with a suitable base, the liquid filtered off from the insoluble salts, and the sulfonic acid set free in the filtrate by precipitating the base, whereupon the solution is oxidized, the oxidized sulfonic acid neutralized with a metallic easily-reducible base, and finally the liquid evaporated to dryness. Experiments now have shown that the same products may be prepared if the original sulfonized compound obtained by the action of sulfuric acid on hydrocarbons free from sulfur is first oxidized and then the soluble salts are separated from the insoluble ones by neutralizing with an alkaline earth or metallic base. This way of production may be explained by the following example:

The reaction product of one kilogram of fuming sulfuric acid upon one kilogram of resin-oil is oxidized with a solution of peroxid of hydrogen, then neutralized with milk of lime filtered off from the precipitate, and the filtrate evaporated to a small volume. The residue is mixed in an alcoholic solution with the corresponding quantity of sulfuric acid, the liquid filtered off from the separated sulfate of calcium, the filtrate freed from the alcohol by distillation, the residual solution neutralized with silver oxid, and the clear solution evaporated to dryness. The silver salt thus produced corresponds to the salt obtained in the example set forth in my aforesaid former application.

Having thus described my invention, what I claim as new therein, and desire to secure by Letters Patent, is—

1. The process of producing sulfonic-acid salts of an easily-reducible metallic base, soluble and permanent in water, which consists in oxidizing the sulfonized compound obtained by the action of sulfuric acid upon hydrocarbons free from sulfur, neutralizing the oxidized product with a suitable base, filtering off the liquid from the precipitated insoluble salts, setting free the oxidized sulfonic acid in the filtrate by precipitating the base, neutralizing the oxidized sulfonic acid with a metallic, easily-reducible base and evaporating the liquid to dryness, substantially as set forth.

2. The process of producing sulfonic-acid salts of an easily-reducible metallic base, soluble and permanent in water, which consists in oxidizing the sulfonized compound obtained by the action of sulfuric acid upon hydrocarbons free from sulfur, neutralizing the oxidized product with lime, filtering off the liquid from the precipitated insoluble salts, setting free the oxidized sulfonic acid in the filtrate by precipitating the lime, neutralizing the oxidized sulfonic acid with silver oxid and evaporating the liquid to dryness, substantially as set forth.

3. As a new product of manufacture the herein-described oxidized sulfonic-acid salts, consisting of a metal proper and an oxidized sulfonic-acid compound derived from hydrocarbons free from sulfur combined with sulfuric acid, which salts form a reddish-brown amorphous powder, are soluble in water, permanent in their solution and give no color with ferric chlorid in aqueous solution, substantially as set forth.

LUDWIG OTTO HELMERS.

Witnesses:
MAX LEMCKE,
E. H. L. MUMMENHOFF.